United States Patent
Jo

(10) Patent No.: US 9,582,439 B2
(45) Date of Patent: Feb. 28, 2017

(54) NONVOLATILE MEMORY SYSTEM AND OPERATING METHOD THEREOF

(71) Applicant: Samsung Electronics Co., Ltd., Suwon-Si, Gyeonggi-Do (KR)

(72) Inventor: Myung Hyun Jo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 39 days.

(21) Appl. No.: 14/459,652

(22) Filed: Aug. 14, 2014

(65) Prior Publication Data

US 2015/0134891 A1    May 14, 2015

(30) Foreign Application Priority Data

Nov. 14, 2013  (KR) .......................... 10-2013-0138423

(51) Int. Cl.
*G06F 12/00* (2006.01)
*G06F 13/00* (2006.01)
(Continued)

(52) U.S. Cl.
CPC .......... *G06F 13/28* (2013.01); *G06F 12/0246* (2013.01); *G06F 13/1673* (2013.01); *G06F 2212/7203* (2013.01)

(58) Field of Classification Search
CPC .... G06F 13/28; G06F 3/0679; G06F 12/0223; G06F 12/023; G06F 12/0238;
(Continued)

(56) References Cited

U.S. PATENT DOCUMENTS 5,467,460 A * 11/1995 Patel ................... G06F 12/0804
                                                711/143
6,327,644 B1 * 12/2001 Beardsley ............. G06F 12/123
                                                711/113
(Continued)

FOREIGN PATENT DOCUMENTS

KR          101030146 B1     4/2011
KR          20110041671 A    4/2011
KR          10-1162679 B1    7/2012

OTHER PUBLICATIONS

Definition Direct Memory Access (DMA); Margaret Rouse; Sep. 2005; retrieved from http://whatis.techtarget.com/definition/Direct-Memory-Access-DMA on Dec. 29, 2015 (1 page).*
(Continued)

*Primary Examiner* — Daniel C Chappell
(74) *Attorney, Agent, or Firm* — Harness, Dickey & Pierce, P.L.C.

(57) ABSTRACT

A nonvolatile memory system includes a nonvolatile memory; a buffer memory having first and second buffers; and a memory controller configured to manage the first and second buffers based on first and second indexes and to control the nonvolatile memory in response to a write request provided from an external device. The memory controller allocates a part of the first buffer to a Direct Memory Access (hereinafter, referred to as DMA) buffer in response to the write request, stores write data received from the external device in the allocated DMA buffer based on a DMA operation, partially swaps the first and second indexes to shift the write data stored in the allocated DMA buffer to the second buffer, and transmits the write data shifted to the second buffer to the nonvolatile memory.

20 Claims, 12 Drawing Sheets

(51) Int. Cl.
*G06F 13/28* (2006.01)
*G06F 12/02* (2006.01)
*G06F 13/16* (2006.01)

(58) Field of Classification Search
CPC ............. G06F 12/0246; G06F 12/0679; G06F 12/0683; G06F 12/0688; G06F 12/0804; G06F 12/0835; G06F 12/0866; G06F 12/1081; G06F 13/1673; G06F 13/1668; G06F 13/282; G06F 13/285; G06F 13/287; G06F 13/30; G06F 13/32; G06F 15/17331; G06F 2212/62; G06F 2212/621; G06F 2212/72; G06F 2212/7201–2212/7207; G06F 2212/7208; G06F 2212/7209–2212/7211; G06F 2213/28; G06F 2213/2802; G06F 2213/2804; G06F 2213/2806; G06F 2213/2808; G11C 16/00
USPC .......................................................... 711/103
See application file for complete search history.

(56) References Cited

U.S. PATENT DOCUMENTS

| | | | | |
|---|---|---|---|---|
| 6,502,169 | B1* | 12/2002 | Noya | .............................. 711/138 |
| 6,941,390 | B2* | 9/2005 | Odom | ..................... G06F 13/28 710/1 |
| 7,136,979 | B2* | 11/2006 | Fuente | ..................... G06F 13/28 711/103 |
| 7,167,926 | B1* | 1/2007 | Boucher | ............. H04L 12/5693 709/250 |
| 7,293,120 | B2* | 11/2007 | Giebel | ..................... G06F 13/28 370/364 |
| 7,353,326 | B2 | 4/2008 | Cho et al. | |
| 7,408,834 | B2 | 8/2008 | Conley et al. | |
| 7,428,617 | B2 | 9/2008 | Okawa et al. | |
| 7,509,391 | B1* | 3/2009 | Chauvel et al. | .............. 709/214 |
| 7,617,362 | B2 | 11/2009 | Craft et al. | |
| 7,761,687 | B2* | 7/2010 | Blumrich | .......... G06F 15/17337 712/11 |
| 7,908,435 | B2 | 3/2011 | Allen | |
| 8,108,583 | B2* | 1/2012 | Clayton | .................. G06F 13/28 710/12 |
| 8,108,593 | B2 | 1/2012 | Yano et al. | |
| 8,140,762 | B2 | 3/2012 | Jibbe et al. | |
| 8,176,252 | B1* | 5/2012 | Alexander | ............. G06F 13/28 710/22 |
| 8,261,006 | B2 | 9/2012 | Chen et al. | |
| 8,271,700 | B1* | 9/2012 | Annem | ................... G06F 13/28 710/22 |
| 8,495,301 | B1* | 7/2013 | Alexander | ............. G06F 13/28 710/22 |
| 8,555,000 | B2 | 10/2013 | Jo et al. | |
| 8,595,457 | B1* | 11/2013 | Kumar | ..................... G06F 13/28 710/52 |
| 2001/0011330 | A1* | 8/2001 | Hughes | ............... G06F 12/0835 711/138 |
| 2003/0061414 | A1* | 3/2003 | Richardson | ......... G06F 13/4045 710/22 |
| 2004/0073703 | A1* | 4/2004 | Boucher et al. | .............. 709/245 |
| 2005/0138235 | A1* | 6/2005 | Ali Khan | ................ G06F 13/28 710/24 |
| 2005/0289253 | A1* | 12/2005 | Edirisooriya | ........... G06F 13/28 710/22 |
| 2006/0026355 | A1 | 2/2006 | Okawa et al. | |
| 2006/0224820 | A1 | 10/2006 | Cho et al. | |
| 2007/0067600 | A1 | 3/2007 | Craft et al. | |
| 2007/0143545 | A1 | 6/2007 | Conley et al. | |
| 2009/0164700 | A1* | 6/2009 | Chen | ................... G06F 12/0246 711/103 |
| 2009/0240871 | A1 | 9/2009 | Yano et al. | |
| 2009/0259789 | A1* | 10/2009 | Kato | ..................... G06F 13/362 710/308 |
| 2009/0265507 | A1 | 10/2009 | Jibbe et al. | |
| 2009/0300281 | A1 | 12/2009 | Allen | |
| 2011/0093659 | A1 | 4/2011 | Jo et al. | |
| 2013/0262736 | A1* | 10/2013 | Kegel et al. | ...................... 711/3 |

OTHER PUBLICATIONS

Chapter 15 Memory Mapping and DMA; Jan. 21, 2005; retrieved from https://static.lwn.net/images/pdf/LDD3/ch15.pdf on Dec. 29, 2015 (52 pages).*

Introduction to Caches; Nov. 26, 2010; retrieved from https://web.archive.org/web/20101126091733/http://www.cs.umd.edu/class/sum2003/cmsc311/Notes/Memory/introCache.html on Dec. 29, 2015 (9 pages).*

DMA-circular: an enhanced high level programmable DMA controller for optimized management of on-chip local memories; Vujic et al; Proceedings of the 9th conference on Computing Frontiers; May 15, 2012; pp. 113-122 (10 pages).*

1212.1-1993—IEEE Standard for Communicating Among Processors and Peripherals Using Shared Memory (DMA); IEEE; 1994 (134 pages).*

* cited by examiner

NONVOLATILE MEMORY SYSTEM AND OPERATING METHOD THEREOF

CROSS-REFERENCE TO RELATED APPLICATIONS

A claim for priority under 35 U.S.C. §119 is made to Korean Patent Application No. 10-2013-0138423 filed Nov. 14, 2013, in the Korean Intellectual Property Office, the entire contents of which are hereby incorporated by reference.

TECHNICAL FIELD

Example embodiments of the inventive concepts described herein relate to a semiconductor memory, and more particularly, relate to a nonvolatile memory system and an operation method thereof.

BACKGROUND

A semiconductor memory device is a memory device which is fabricated using semiconductors such as silicon (Si), germanium (Ge), gallium arsenide (GaAs), indium phosphide (InP), and the like. Semiconductor memory devices are classified into volatile memory devices and nonvolatile memory devices.

The volatile memory devices may lose stored contents at power-off. The volatile memory devices include a Static RAM (SRAM), a Dynamic RAM (DRAM), a Synchronous DRAM (SDRAM), etc. In contrast, the nonvolatile memory devices may retain stored contents even at power-off. The nonvolatile memory devices include a Read Only Memory (ROM), a Programmable ROM (PROM), an Electrically Programmable ROM (EPROM), an Electrically Erasable and Programmable ROM (EEPROM), a flash memory device, a Phase-change RAM (PRAM), a Magnetic RAM (MRAM), a Resistive RAM (RRAM), a Ferroelectric RAM (FRAM), etc.

Recently, storage media has been developed that uses a nonvolatile memory instead of a hard disk. While an operation speed of storage media that utilizes nonvolatile memory is faster than that of the hard disk, the speed of an interface between a host and the storage media may be a limiting factor. For this reason, the nonvolatile memory may use a buffer memory for compensating for a slow interface speed. The buffer memory is used to store data temporarily and communicates with the host and the storage media through a direct memory access operation.

SUMMARY

At least one example embodiments of the inventive concepts is directed to a nonvolatile memory system.

In one or more example embodiments, the nonvolatile memory system includes a nonvolatile memory; a buffer memory having first and second buffers; and a memory controller configured to manage the first and second buffers based on first and second indexes and to control the nonvolatile memory in response to a write request provided from an external device. The memory controller allocates a part of the first buffer to a Direct Memory Access (hereinafter, referred to as DMA) buffer in response to the write request, stores write data received from the external device in the allocated DMA buffer based on a DMA operation, partially swaps the first and second indexes to shift the write data stored in the allocated DMA buffer to the second buffer, and transmits the write data shifted to the second buffer to the nonvolatile memory.

In one or more example embodiments, the memory controller includes a central processing unit configured to allocate a part of the first buffer to a DMA buffer in response to the write request; and a DMA engine programmed by the central processing unit and configured to perform the DMA operation.

In one or more example embodiments, the central processing unit programs the DMA engine with information of the allocated DMA buffer, and the DMA engine performs the DMA operation based on the information of the allocated DMA buffer.

In one or more example embodiments, the first index comprises mapping information between a logical page number of the first buffer and a logical address corresponding to data received from the host, and the second index comprises mapping information between a logical page number of the second buffer and a logical address corresponding to the data received from the host.

In one or more example embodiments, when the write data stored in the allocated DMA buffer is shifted to the second buffer, the memory controller determines whether the second buffer includes the write data and swaps the first and second indexes based on the determination result.

In one or more example embodiments, as a consequence of determining that the second buffer includes the write data, the memory controller provides the nonvolatile memory with the write data included in the second buffer, and the nonvolatile memory programs the write data transferred from the memory controller.

In one or more example embodiments, the memory controller manages the second buffer based on at least one of a hash algorithm, a tree algorithm, and a linear algorithm.

In one or more example embodiments, the first and second buffers are logically distinguished.

In one or more example embodiments, the memory controller allocates a part of the first buffer to a DMA read buffer in response to a read request from the external device, stores read data read from the nonvolatile memory in the allocated DMA read buffer, and provides the external device with the read data stored in the allocated DMA read buffer.

In one or more example embodiments, the memory controller releases the allocated DMA read buffer of the first buffer after the read data is transferred to the external device.

Another example embodiment of the inventive concepts is directed to an operation method of a nonvolatile memory system.

In one or more example embodiments, the operation method includes first and second buffers and a nonvolatile memory, the operation method comprising allocating a part of the first buffer to a DMA buffer in response to a write request from an external device; storing the write data in the allocated DMA buffer; swapping first and second indexes to shift the write data stored in the allocated DMA buffer to the second buffer; and providing the write data stored in the second buffer to the nonvolatile memory, wherein the first and second buffers are respectively managed based on the first and second indexes.

In one or more example embodiments, shifting of shift the write data, stored in the allocated DMA buffer, to the second buffer comprises determining whether the write data is stored in the second buffer; and shifting the write data to the second buffer based on the determination result.

In one or more example embodiments, the shifting the write data to the second buffer based on the determination result comprises, as a consequence of determining that the write data is not stored in the second buffer, swapping information of the first index corresponding to the allocated DMA buffer and information of the second index corresponding to a part of the second buffer.

In one or more example embodiments, the operation method further includes allocating a part of the first buffer to a DMA read buffer in response to a read request from the external device; storing read data read from the nonvolatile memory in the allocated DMA read buffer; and transferring the read data stored in the allocated DMA read buffer to the external device.

In one or more example embodiments, the operation method further includes releasing the allocated DMA read buffer of the first buffer after the read data stored in the allocated DMA read buffer is transferred to the external device.

One or more example embodiments relate to a nonvolatile memory device.

In one or more example embodiments, the non-volatile memory device includes a buffer memory and a memory controller. The buffer memory has logical addresses (LAs) dividing the buffer memory into a first buffer and a second buffer, the first buffer managed based on a first index and the second buffer managed based on a second index, the second buffer configured to temporarily store data received from the first buffer destined for a non-volatile memory. The memory controller including a Direct Memory Access (DMA) engine and a Central Processing Unit (CPU), the DMA engine configured to offload, from the CPU, memory access requests associated with data by performing a DMA operation on the data without control from the CPU. The memory controller configured to, allocate a portion of the first buffer as a DMA buffer irrespective of whether the buffer memory contains the data, store the data in the DMA buffer, and transfer the logical address of the data from the first index to the second index, if the data is not stored in the second buffer.

In one or more example embodiments, the memory controller is configured to transfer the data from the second buffer to the non-volatile memory if the data is stored in the second buffer.

In one or more example embodiments, the memory controller is configured to release the DMA buffer after the data is transferred.

In one or more example embodiments, the memory controller is configured to allocate the portion of the first buffer as the DMA buffer without searching the buffer memory for the data.

In one or more example embodiments, the memory controller is configured to allocate the DMA buffer in less than 3.4 microseconds (μs) from the memory access request.

In one or more example embodiments, the memory controller transfers the data to the second buffer using virtual addressing.

With example embodiments of the inventive concepts, receiving a read or write request from an external device, a nonvolatile memory system may allocate a DMA buffer without a separate search operation. As DMA latency is reduced by a time corresponding to a search operation, the nonvolatile memory system with improved performance and its operation method may be provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
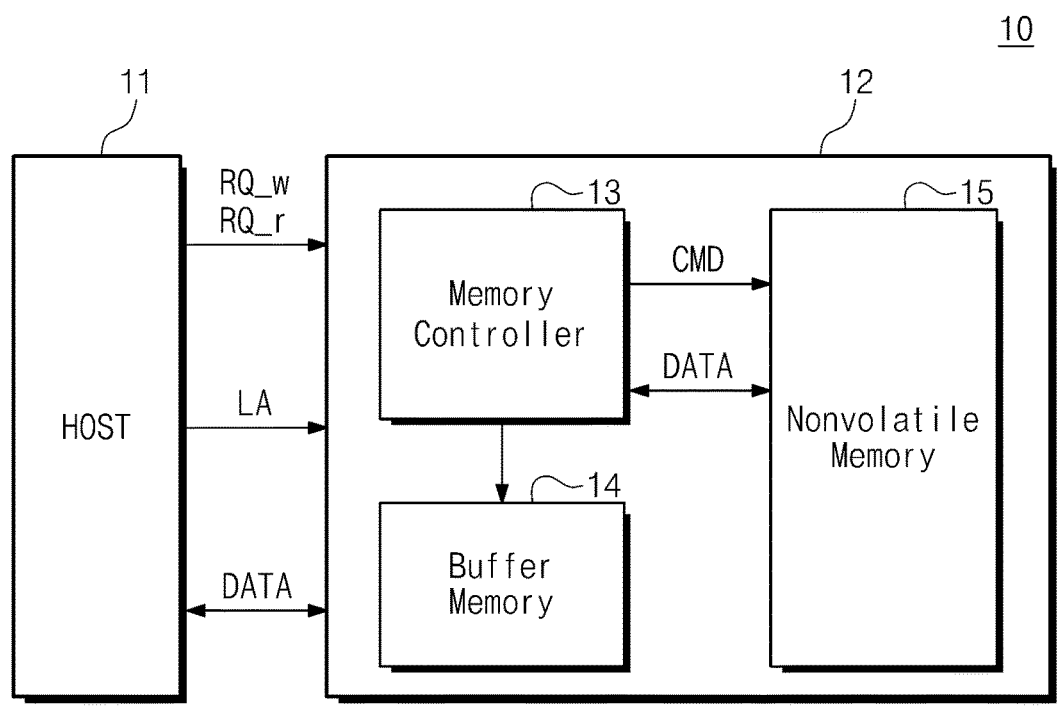
FIG. 1 is a block diagram schematically illustrating a user system.

Example embodiments will be described in detail with reference to the accompanying drawings. Example embodiments of the inventive concept, however, may be embodied in various different forms, and should not be construed as being limited only to the illustrated example embodiments. Rather, these example embodiments are provided as examples so that this disclosure will be thorough and complete, and will fully convey the concept of the inventive concept to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A nonvolatile memory system according to an example embodiment of the inventive concepts includes first and second buffers. The first buffer performs a Direct Memory Access (DMA) operation with a host or a nonvolatile memory without performing a buffer search operation, in other words, without considering a cache hit. The second buffer manages write data to be written in the nonvolatile memory and sends it to the nonvolatile memory. Performing the DMA operation, the nonvolatile memory system allocates a DMA buffer without a search operation. Thus, overhead caused by the search operation may be reduced. As DMA latency decreases, the nonvolatile memory system and its operation method with improved performance may be provided.

FIG. 1 is a block diagram schematically illustrating a user system.

Referring to FIG. 1, a user system 10 includes a host 11 and a nonvolatile memory device 12. The host 11 may transmit data, read and write requests RQ_r and RQ_w, and a logical address LA to the nonvolatile memory system 12. The host 11 may exchange data with the nonvolatile memory system 12.

The nonvolatile memory device 12 operates in response to signals from the host 11. The nonvolatile memory system 12 has a memory controller 13, a buffer memory 14, and a nonvolatile memory 15. The memory controller 13 performs read and write operations about the nonvolatile memory 15 in response to the read and write requests RQ_r and RQ_w and the logical address LA from the host 11.

The buffer memory 14 may be used to compensate for a speed difference between the host 11 and the nonvolatile memory 15. The buffer memory 14 temporarily stores data received from the host 11 and data read from the nonvolatile memory 15. The buffer memory 14 exchanges data with the host 11 and/or the nonvolatile memory 15 based on a Direct Memory Access (hereinafter, referred to as "DMA") operation. For example, the memory controller 13 manages the buffer memory 14 and searches data stored in the buffer memory 14 based on a cache algorithm such as a linear algorithm, a tree algorithm, a hash algorithm, etc.

Figure 2:
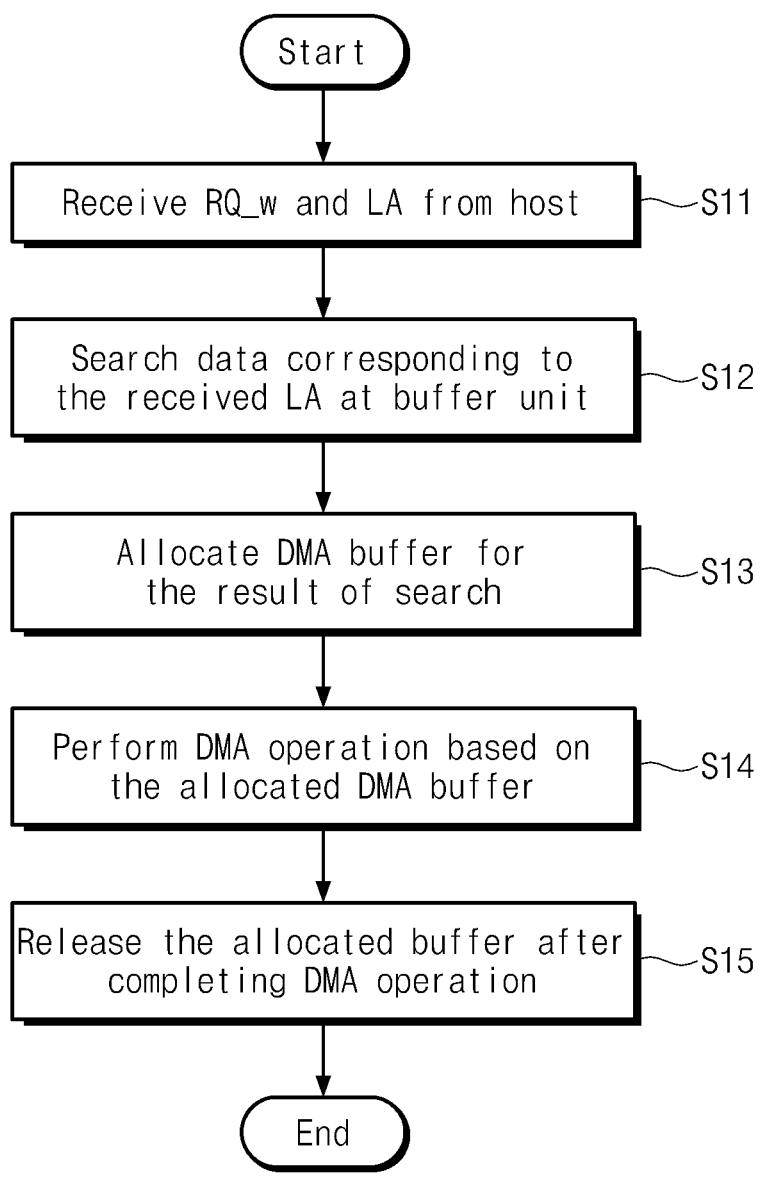
FIG. 2 is a flow chart showing an operation of a nonvolatile memory system shown in FIG. 1.
Figure 3:
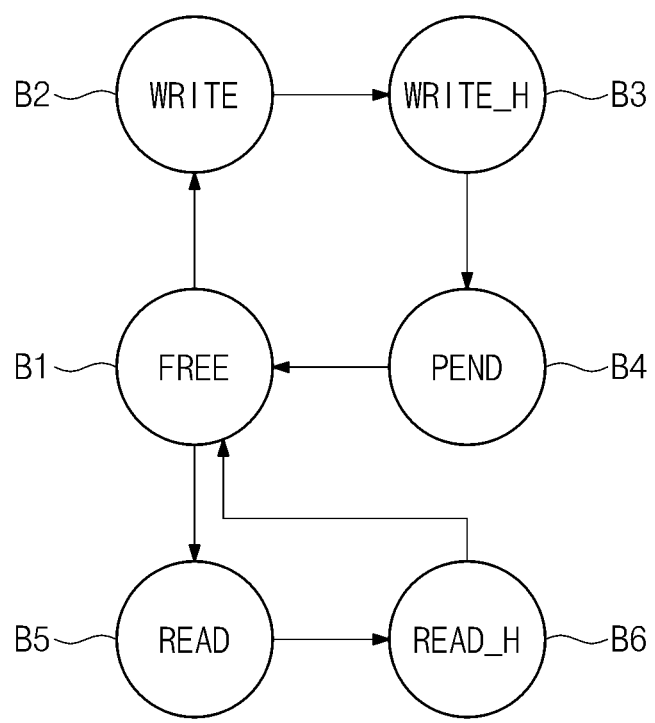
FIG. 3 is a diagram schematically illustrating buffer states of a buffer memory shown in FIG. 1.

FIG. 2 is a flow chart showing an operation of a nonvolatile memory system shown in FIG. 1. FIG. 3 is a diagram schematically illustrating buffer states of a buffer memory shown in FIG. 1.

Referring to FIGS. 1 to 3, the buffer memory 14 includes a plurality of buffer units. Each of the buffer units may have one of a plurality of buffers states B1 to B6.

For example, the buffer unit 14 may have a free state B1. The free state B1 may indicate a buffer state where the buffer unit 14 does not have write data and read data stored therein and where the buffer unit 14 is not allocated to a DMA buffer.

Write Request

In step S11, a nonvolatile memory system 12 receives a write request RQ and a logical address LA from a host 11.

In step S12, the nonvolatile memory system 12 searches data corresponding to the logical address LA from a buffer memory 14. For example, the memory controller 13 performs a search operation to determine whether data corresponding to the logical address LA is included in the buffer memory 14, based on a cache algorithm.

In step S13, the nonvolatile memory system 12 allocates a DMA buffer based on a search result of step S12. For example, as a consequence of determining that data corresponding to the logical address LA is not stored in the buffer memory 14, the nonvolatile memory system 12 allocates some of buffer units of the buffer memory 14 to the DMA buffer.

As a consequence of determining that data corresponding to the logical address LA is stored in the buffer memory 14, the nonvolatile memory system 12 allocates a buffer unit, in which data corresponding to the logical address LA is stored, to the DMA buffer. For example, in the event that a buffer unit, in which data corresponding to the logical address LA is stored, is allocated to the DMA buffer, data may be overwritten on the allocated DMA buffer.

The DMA buffer may be an area of the buffer memory 14 where data received from a host 11 is to be temporarily stored based on a DMA operation. The allocated DMA buffer area may be a write state B2. The write state B2 indicates a buffer state allocated for the DMA operation with the host 11 during a write operation.

In step S14, the nonvolatile memory system 12 performs the DMA operation based on the allocated DMA buffer. For example, write data received from the host 11 may be stored in the allocated DMA buffer through the DMA operation.

The DMA buffer in which the write data is stored is switched to a write data storage WRITE_H state B3. The write data storage state B3 indicates a buffer state in which write data is stored through the DMA operation. For example, the write data stored in the DMA buffer is transferred to a nonvolatile memory 15.

In the event that the nonvolatile memory 15 starts a program operation about the write data, a buffer unit of the write data storage state B3 is switched to a program PEND state B4. The program state B4 indicates a buffer state in which write data is being programmed in the nonvolatile memory 15.

In step S15, the DMA buffer allocated after the program operation is ended is released. For example, a buffer of the program state B4 is switched to a buffer of the free state B1 after the program operation is ended.

Read Request

In example embodiments, in the event that the nonvolatile memory system 12 receives a read request RQ from the host 11, a part of the buffer memory 14 is switched to a read state B5. The read state B5 indicates a buffer state allocated for a DMA operation with the nonvolatile memory 15 at a read operation.

After the DMA operation is ended, a buffer having the read state B5 is changed into a read data storage READ_H state B6. The read data storage state B6 is a state in which read data is stored as a result of the DMA operation. For example, when there is received a read request RQ_r about a logical address corresponding to a buffer of the read data storage state B6, data stored in a buffer of the read data storage state B6 is sent to the host 11.

A buffer of the read data storage state B6 may be switched to a buffer of the free state B1 according to a buffer replacement policy. For example, the buffer replacement policy may be an operation of releasing a buffer based on a method such as a FIFO method, a least recently used method, and the like.

As described above, if a buffer unit of the buffer memory 14 is changed from the free state B1 to the write state B2 or if a buffer unit of the buffer memory 14 is changed from the free state B1 to the read state B5, that is, if a read or write request RQ_r or RQ_w is received from the host 11, the memory controller 13 performs a search operation for determining whether data corresponding to a logical address LA is stored in the buffer memory 14 and allocates the DMA buffer based on a determination result.

In example embodiments, a search operation about a specific user pattern (e.g., QD1, etc.) causes overhead to increase DMA latency. Thus, performance of a user system may be lowered.

Figure 4:
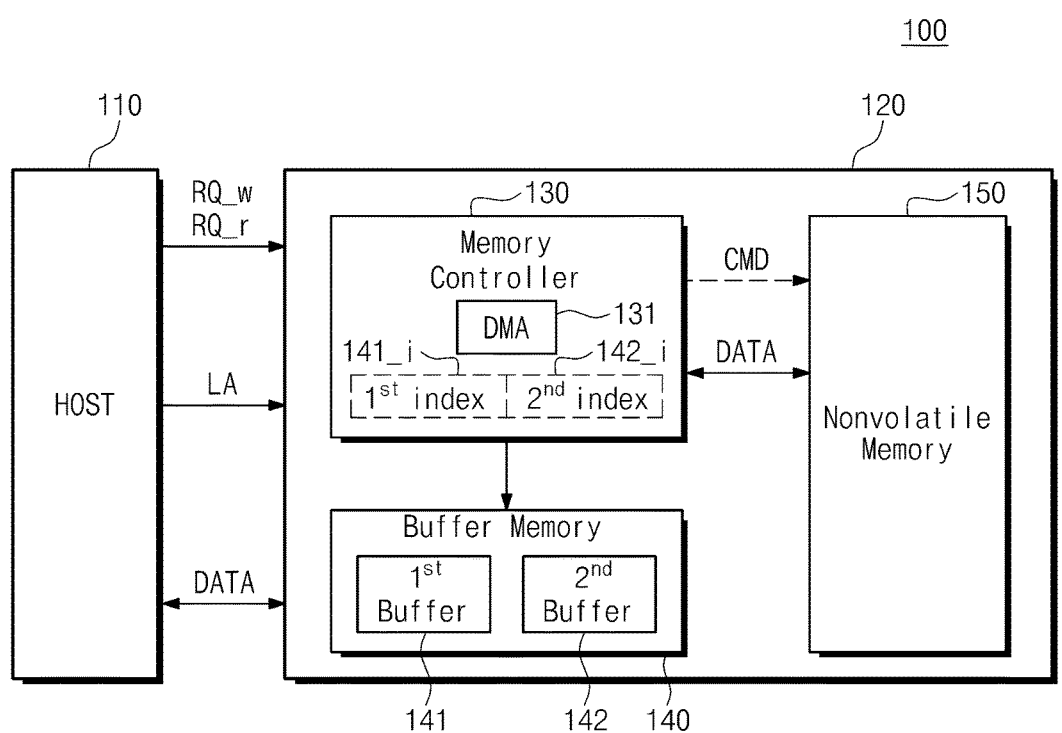
FIG. 4 is a block diagram schematically illustrating a user system according to an example embodiment of the inventive concepts.

FIG. 4 is a block diagram schematically illustrating a user system according to an example embodiment of the inventive concepts.

The user system 100 may be implemented by, for example, a ultra-mobile personal computer (UMPC), a workstation, a net-book, a personal digital assistance (PDA), a portable computer, a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, etc.

Referring to FIG. 4, the user system 100 includes a host 110 and a nonvolatile memory system 120. The host 110 exchanges data with the nonvolatile memory system 120 using a USB (Universal Serial Bus) protocol, SCSI (Small Computer System Interface) protocol, PCI express protocol, ATA protocol, PATA (Parallel ATA) protocol, SATA (Serial ATA) protocol, SAS (Serial Attached SCSI) protocol, MIPI (Mobile Industry Processor Interface) protocol, NVMe Interface protocol, or the like. The host 110 may send read and write requests RQ_r and RQ_w and a logical address LA to the nonvolatile memory system 120. The host 110 exchanges data with the nonvolatile memory system 120.

The nonvolatile memory system 120 includes a memory controller 130, a buffer memory 140, and a nonvolatile memory 150. The memory controller 130 performs a data write operation or a data read operation about the nonvolatile memory 150 in response to the read and write requests RQ_r and RQ_w from the host 110.

The memory controller 130 includes a direct memory access engine (hereinafter, referred to as "DMA engine") 131. The DMA engine 131 controls a data flow among the host 110, the buffer memory 140, and the nonvolatile memory 150 without intervention of the memory controller 130.

The memory controller 130 is configured to control first and second indexes 141_i and 142_i. The first index 141_i may include mapping information between logical page numbers LPN and logical addresses LA of first buffers 141. The second index 142_i may include mapping information between logical page numbers LPN and logical addresses LA of second buffers 142.

For example, the first and second buffers 141 and 142 may be managed by a page unit. A page unit may be a data unit defined by an operating system OS of the host 110. The memory controller 130 may manage indexes 141_i and 142_i of the first and second buffers 141 and 142 by the page unit. A structure of the memory controller 130 will be more fully described with reference to FIG. 5.

The buffer memory 140 may be a buffer memory for compensating for a speed difference between the host 110 and the nonvolatile memory 150. The buffer memory 140 temporarily stores data received from the host 110 or data read from the nonvolatile memory 150. The buffer memory 140 exchanges data with the host 110 or with the nonvolatile memory 150 according to a control of the DMA engine 131.

The buffer memory 140 includes the first buffer 141 and the second buffer 142. The first buffer 141 may be a data transfer buffer for exchanging data with the host 110 and/or with the nonvolatile memory 150. The second buffer 142 may be a program management buffer for managing data to be written in the nonvolatile memory 150.

The first buffer 141 may include a buffer area that temporarily stores data received from the host 110 and/or the nonvolatile memory 150. For example, a part (or, a buffer unit) of the first buffer 141 may be allocated to a DMA buffer according to a control of the memory controller 130. The first buffer 141 stores write data received from the host 110 or read data read from the nonvolatile memory 150 according to a control of the DMA engine 131.

Unlike the memory controller 13, the memory controller 130 may allocate a part of the first buffer 141 to a DMA buffer without performing a search operation S12 shown in FIG. 2.

The second buffer 142 may include a buffer area which temporarily stores write data to be written in the nonvolatile memory 150. For example, the first buffer 141 may store write data from the host 110 according to a control of the DMA engine 131. At this time, the write data stored in the first buffer 141 may be transferred to the second buffer 142.

If write data stored in the first buffer 141 is transferred to the second buffer 142, the memory controller 130 may manage the first and second indexes 141_i and 142_i such that a logical page number of a buffer area, in which write data is stored, of the first buffer 141 and a page number of a part of the second buffer 142 are swapped. With this operation, the write data may be included in the second buffer 142. That is, the memory controller 130 manages the first and second buffers 141 and 142 without physical data copy.

The first buffer 141 and the second buffer 142 may be distinguished using a logical area. That is, the first and second buffers 141 and 142 may be implemented in a memory device, a package, a chip, or a module, and the first and second buffers 141 and 142 may be logically distinguished. A capacity of a buffer area of the second buffer 142 may be larger than that of the first buffer 141.

The memory controller 130 may manage the second buffer 142 based on a cache algorithm such as a linear algorithm, a tree algorithm, a hash algorithm, etc. An operation and a structure of the buffer memory 140 will be more fully described with reference to accompanying drawings.

The nonvolatile memory 150 operates in response to a control of the memory controller 130. For example, the nonvolatile memory 150 may be used as storage of the user system 100. The nonvolatile memory 150 may include nonvolatile memory elements such as PRAM, MRAM, ReRAM, or PRAM elements.

In one or more example embodiment of the inventive concepts, since the nonvolatile memory system 120 does not perform a search operation S12 shown in FIG. 2 at allocation of a DMA buffer, DMA latency may be reduced. Thus, a nonvolatile memory system with improved performance may be provided.

Figure 5:
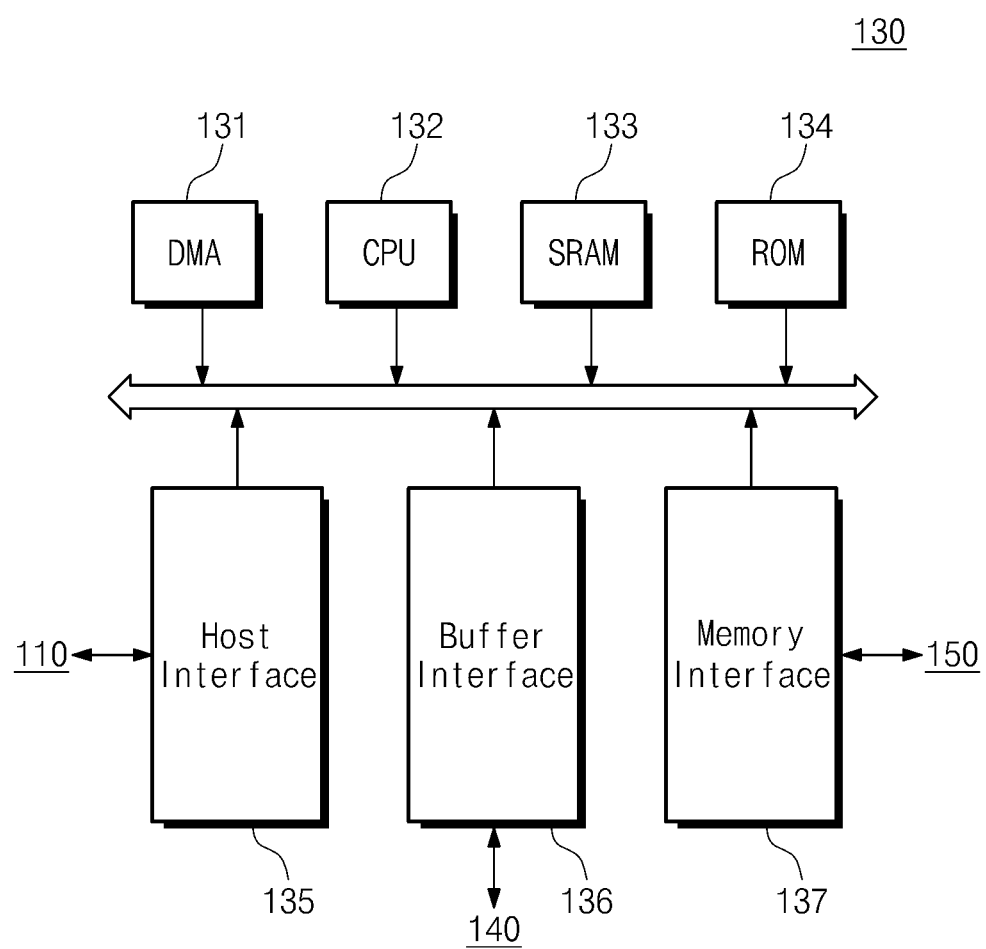
FIG. 5 is a block diagram schematically illustrating a memory controller shown in FIG. 4.

FIG. 5 is a block diagram schematically illustrating a memory controller shown in FIG. 4.

Referring to FIGS. 4 and 5, a memory controller 130 includes the DMA engine 131, a Central Processing Unit (CPU) 132, an SRAM 133, a ROM 134, a host interface 135, a buffer interface 136, and a memory interface 137.

The CPU 132 controls an overall operation of the memory controller 130. The DMA engine 131 operates in response to a control of the CPU 132. For example, the DMA engine 131 is programmed by the CPU 132 and operates based on programmed information. The CPU 132 allocates a DMA buffer and programs the DMA engine 131 with information of the allocated DMA buffer. Based on the programmed information, the programmed DMA engine 131 controls a data flow among the host 110, the buffer memory 140, and the nonvolatile memory 150 without a control of the CPU 132 (e.g., based on direct memory access (DMA)).

The SRAM 133 may be a cache memory, buffer memory, or a temporary memory of the CPU 132. The SRAM 133 may include the first and second indexes 141_i and 142_i. The CPU 132 manages the first and second buffers 141 and 142 based on the first and second indexes 141_i and 142_i that are stored in the SRAM 133.

The ROM 134 stores information for operations of the nonvolatile memory system 120. The ROM 134 may store firmware-type information for operations of the nonvolatile memory system 120.

The host interface 135 may support communications with the host 110. The buffer interface 136 may support communications with a buffer memory 140. The memory interface 137 may support communications with the nonvolatile memory 150.

Figure 6:
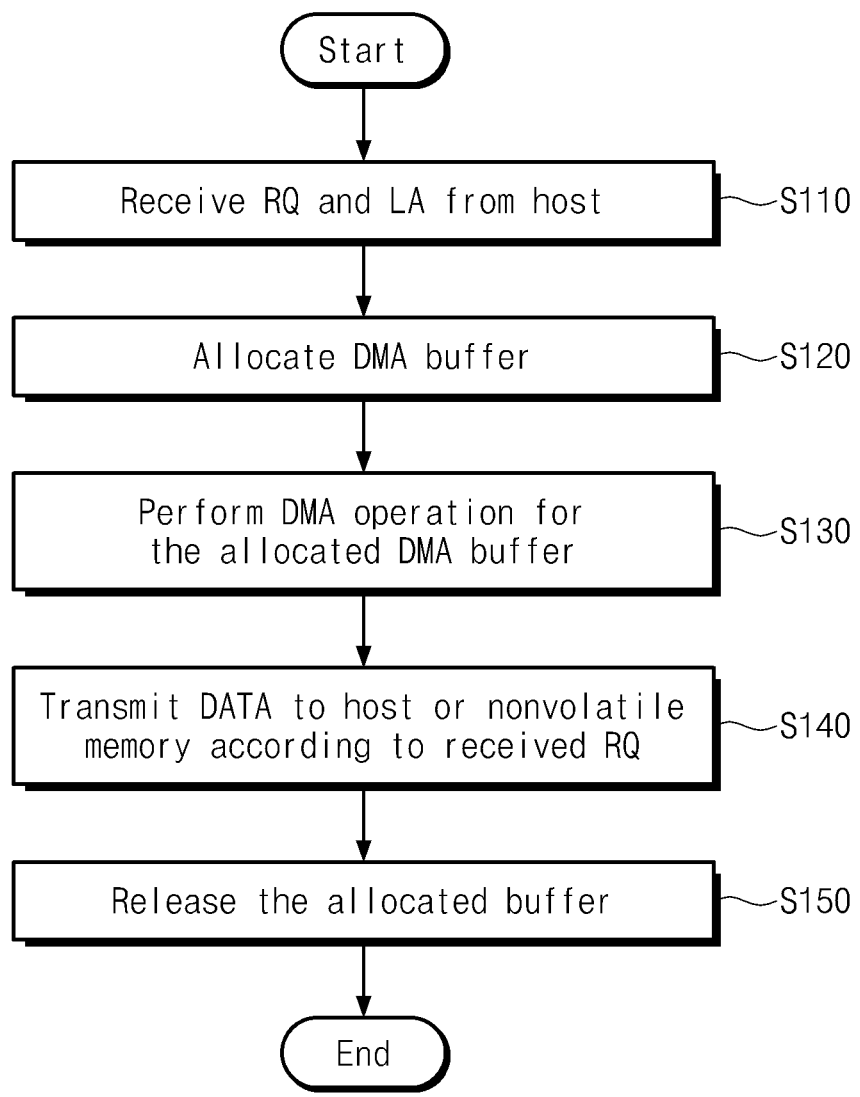
FIG. 6 is a flow chart showing an operation of a nonvolatile memory system shown in FIG. 4.

FIG. 6 is a flow chart showing an operation of a nonvolatile memory system shown in FIG. 4.

Referring to FIGS. 4 to 6, in step S110, the nonvolatile memory system 120 receives a request RQ and a logical address LA from the host 110. The request RQ may be a read request RQ_r or a write request RQ_w.

In step S120, the nonvolatile memory system 120 allocates a part of a first buffer 141 to a DMA buffer. For example, a CPU 132 may program a DMA engine 131 such that a part of the first buffer 141 is allocated to the DMA buffer.

Compared with an operation method shown in FIG. 2, the nonvolatile memory system 120 does not perform a search operation S12 shown in FIG. 2. That is, since the nonvolatile memory system 120 allocates a DMA buffer without performing a search operation, DMA latency may be reduced. Here, the DMA latency may indicate a time span from a time when the request RQ is received from the host 110 to time when a DMA operation starts using an allocated DMA buffer.

In step S130, a DMA operation about the allocated DMA buffer is performed. For example, in the event that the request RQ received from the host 110 is a write request RQ_w, the DMA engine 131 stores write data DATA received from the host 110 in the DMA buffer. If the request RQ received from the host 110 is a read request RQ_R, the DMA engine 131 stores data DATA read from the nonvolatile memory 150 in the DMA buffer. For example, the DMA operation is an operation in which the DMA engine 131 stores write or read data in the DMA buffer without a control of the CPU 132.

In step S140, after the DMA operation is ended, data stored in the DMA buffer is sent to the host 110 or to the nonvolatile memory 150 according to the received request RQ. For example, when the write request RQ_w is received from the host 110, the memory controller 130 provides the nonvolatile memory 150 with data stored in the allocated DMA buffer. If the read request RQ_r is received from the host 110, the memory controller 130 provides the host 110 with data stored in the allocated DMA buffer.

In step S150, after the data transfer is ended, the DMA buffer is released. For example, released buffers may be changed into a free state.

Since a DMA buffer is allocated without a buffer search operation, DMA latency is reduced. The DMA latency may mean a time span from a point of time when the request RQ is received from the host 110 to a point of time when a DMA operation starts using an allocated DMA buffer. That is, since a DMA buffer is allocated without a buffer search operation, the DMA latency from when a write request RQ_w is received from the host 110 to when write data is received with a DMA buffer allocated may be reduced. Likewise, the DMA latency from when a read request RQ_r is received from the host 110 to when read data is received from the nonvolatile memory 150 with a DMA buffer allocated may be reduced.

The DMA latency of the nonvolatile memory system may be reduced from about 6 μs to 3.4 μs compared with a conventional memory system where a search operation is performed when a write request is received.

In one or more example embodiments, data corresponding to a specific user pattern (e.g., QD1) of a read or write request RQ_r or RQ_w of the host 110 may make the DMA latency affect performance.

Figure 7:
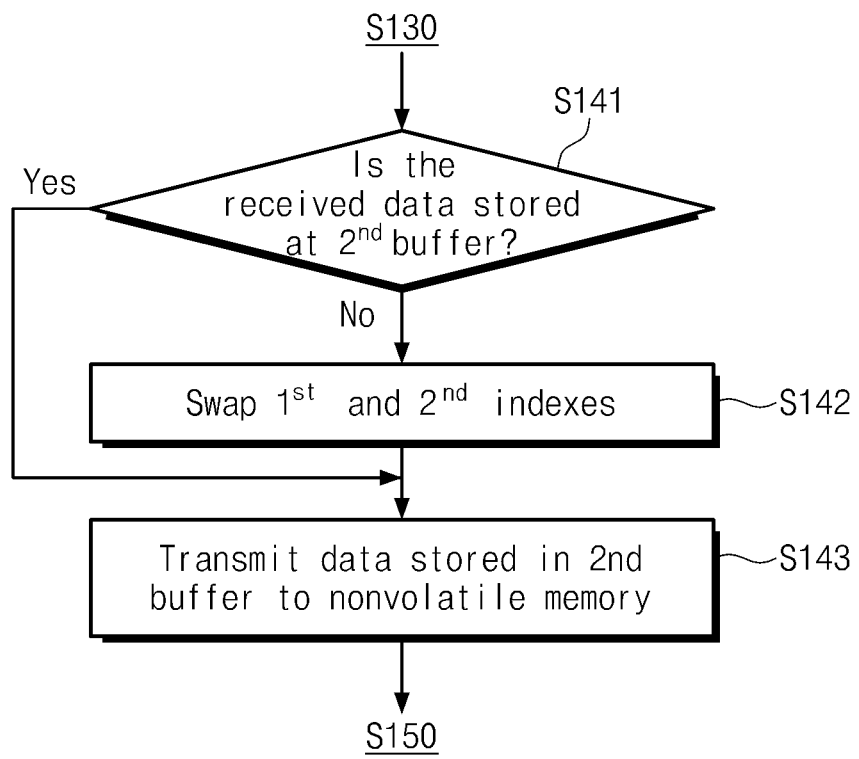
FIG. 7 is a detailed flow chart of step S140 shown in FIG. 4.

FIG. 7 is a detailed flow chart of step S140 shown in FIG. 4 when a received request RQ is a write request RQ_w.

Referring to FIGS. 4 to 7, when a write request RQ_w is received from the host 110, the nonvolatile memory system 120 performs an operation corresponding to step S141 after step S130. In step S141, the nonvolatile memory system 120 determines whether received data is stored in a second buffer 142.

If the nonvolatile memory system 120 determines that received data is not stored in the second buffer 142, in step S142, the nonvolatile memory system 120 swaps indexes 141_*i* and 142_*i* of first and second buffers 141 and 142. For example, in the event that write data is not stored in the second buffer 142, the nonvolatile memory system 120 swaps a logical page number of a buffer area, being allocated to a DMA buffer, of the first buffer 141 and a logical page number of a buffer area, having a free state B1, of the second buffer 142. Afterwards, a DMA buffer in which write data is stored is managed as the second buffer 142.

If the nonvolatile memory system 120 determines that received data is stored in the second buffer 142, in operation S143, the nonvolatile memory system 120 provides write data stored in the second buffer 142 to the nonvolatile memory 150. For example, the nonvolatile memory 150 programs the received write data.

After a program operation of the nonvolatile memory 150 is ended, in step S150, the nonvolatile memory system 120 may release the second buffer 142 in which write data is stored.

As described with reference to FIG. 7, overhead caused by physical data copy may be reduced by swapping the first and second indexes 141_*i* and 142_*i* when write data stored in the first buffer 141 is transferred to the second buffer 142. Thus, there is provided a nonvolatile memory system with improved performance.

Figure 8:
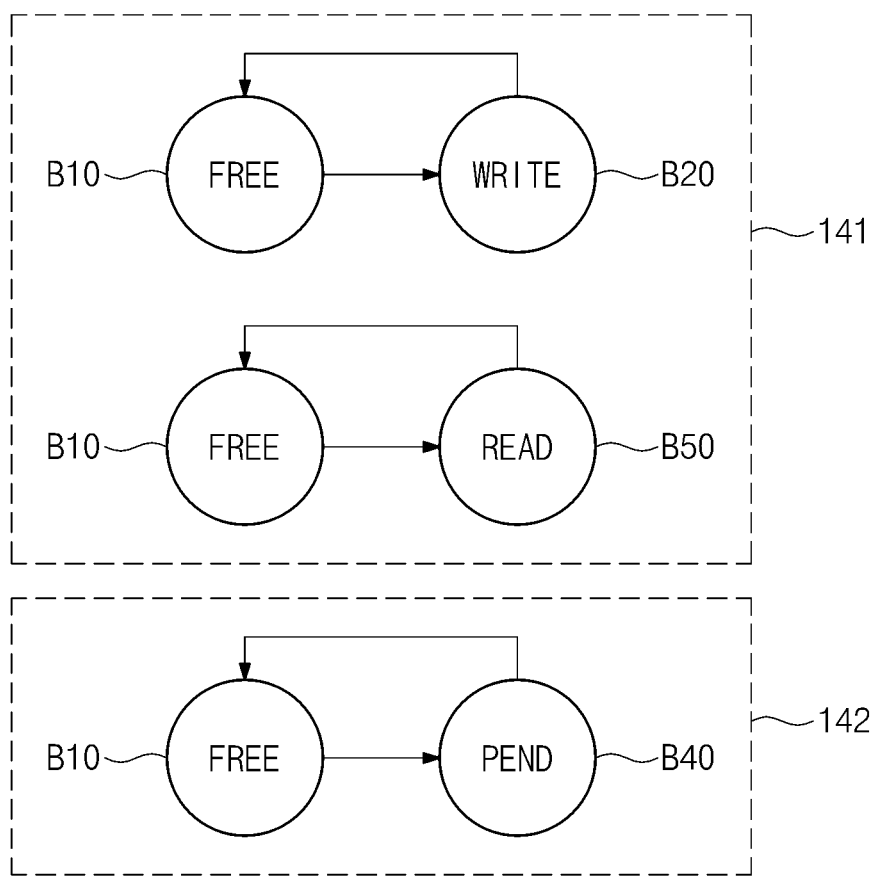
FIG. 8 is a diagram schematically illustrating states of a buffer memory shown in FIG. 4.

FIG. 8 is a diagram schematically illustrating states of a buffer memory shown in FIG. 4.

Referring to FIGS. 4 to 8, a first buffer 141 and a second buffer 142 may have one of a plurality of buffer states B10, B20, S40, and B50.

For example, the first buffer 141 and the second buffer 142 may have a free state B10. The free state B10 indicates a buffer state where data is not stored or where they are not allocated to a DMA buffer.

Write Request

The first buffer 141 is switched to a write state B20 to receive write data from the host 110. The write state B20 indicates a buffer state allocated to store write data received from the host 110.

In the event that the write data received from the host 110 is stored in the first buffer 141 of the write state B20 according to an operation of a DMA engine 131, write data stored in the first buffer 141 may be transferred to the second buffer 142.

For example, after write data received from the host 110 is stored in the first buffer 141 of the write state B20, a memory controller 130 searches whether the stored write data exists in the second buffer 142. The memory controller 130 may manage the second buffer 142 based on a cache algorithm such as a hash algorithm, a tree algorithm, or a linear algorithm and may search the second buffer 142 based thereon.

Based on the search result, the memory controller 130 swaps the index 141_*i* of the first buffer 141 and the index 142_*i* of the second buffer 142 such that write data is included in the second buffer 142 without physical data copy. An area of the second buffer 142 corresponding to the swapped index is changed from a free state B10 to a program PEND state B40. After a program operation of the nonvolatile memory 150 is ended, buffers of the program state B40 are switched to the free state B10.

Read Request

The nonvolatile memory system 120 receives a read request RQ from the host 110. At this time, a part of the first buffer 141 is allocated to a DMA buffer, and a buffer unit allocated to the DMA buffer is changed to a read state B50. The read state B50 is a buffer state allocated to store read data read from the nonvolatile memory 150 through a DMA operation. If an input of the read data read from the nonvolatile memory 150 through a DMA operation is ended, read data is sent to the host 110. After transferring of read data to the host 110 is ended, a buffer area of the read state B50 is switched to the free state B10.

As described with reference to FIG. 8, since the nonvolatile memory system 120 does not perform a separate search operation S12 shown in FIG. 2, it does not have a write data storage WRITE_H state B3 and a read data storage READ_H state B6. Thus, search overhead is reduced at a DMA operation, so a DMA latency time decreases. That is, a nonvolatile memory system with improved performance is provided.

Figure 9:
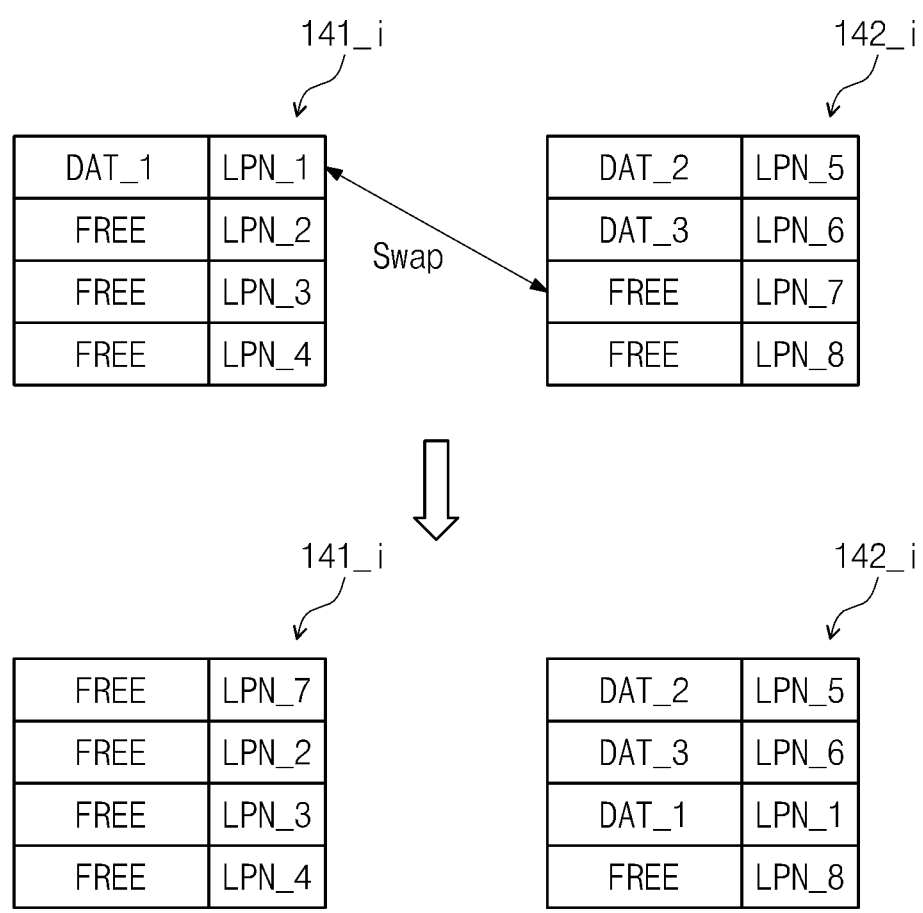
FIG. 9 is a diagram for describing an operation of a nonvolatile memory system shown in FIG. 8.

FIG. 9 is a diagram for describing an operation of a nonvolatile memory system shown in FIG. 8.

Referring to FIGS. 4, 8, and 9, the memory controller 130 manages first and second buffers 141 and 142 based on first and second indexes 141_*i* and 142_*i*. The first and second indexes 141_*i* and 142_*i* include mapping information between logical addresses LA and logical page numbers LPN of the first and second buffers 141 and 142.

For example, the first buffer 141 includes buffer units corresponding to first to fourth logical page numbers LPN_1 to LPN_4, and the second buffer 142 includes buffer units corresponding to fifth to eighth logical page numbers LPN_5 to LPN_8. For ease of description, it is assumed that the first buffer 141 includes first to fourth buffer units and the second buffer 142 includes fifth to eighth buffer units. However, example embodiments of the inventive concepts are not limited thereto. For example, the first and second buffers 141 and 142 may include more buffer units.

If a write request RQ_w is received from the host 110, the memory controller 130 allocates a part of the first buffer 141 to a DMA buffer. For example, the memory controller 130 allocates a buffer unit (hereinafter, referred to as a "first buffer unit") corresponding to a first logical page number LPN_1 to the DMA buffer. First data DAT_1 corresponding to a first logical address is written in the first buffer unit allocated to the DMA buffer through DMA operation. At this time, the memory controller 130 writes mapping information between a logical address of the first data DAT_1 and the first logical page number LPN_1 in the first index 141_*i*, and manages the first buffer 141 based on a writing result.

After a DMA operation about the allocated DMA buffer is ended, the memory controller 130 determines whether the first data DAT_1 is included in the second buffer 142. The memory controller 130 swaps the first and second indexes 141_*i* and 142_*i* if the data is not included in the second buffer 142.

In the example illustrated in FIG. 9, in the second index 142_*i*, a buffer unit corresponding to the fifth logical page number LPN_5 stores second data DAT_2 and a buffer unit corresponding to the sixth logical page number LPN_6 stores third data DAT_3. In that case, the memory controller 130 may determine that the first data DAT_1 is not stored in the second buffer 142.

At this time, the memory controller 130 swaps a portion of the first index 141_i and the second index 142_i that correspond to one or more buffer units having a free state B10 (refer to FIG. 8).

In the example illustrated in FIG. 9, the memory controller 130 swaps information of the first logical page number LPN_1 of the first index 141_i and information of the seventh logical page number LPN_7 of the second index 142_i.

Afterwards, the first buffer 141 includes buffer units corresponding to the seventh logical page number LPN_7 and the second to fourth logical page numbers LPN_2 to LPN_4. The second buffer 142 includes buffer units corresponding to the fifth, sixth, first, and eighth logical pages LPN_5, LPN_6, LPN_1, and LPN_8. The memory controller 130 manages the first and second buffers 141 and 142 based on the swapped versions of the first and second indexes 141_i and 142_i.

Although not shown, the second buffer 142 is managed based on a cache algorithm such as a tree algorithm, a linear algorithm, or a hash algorithm. That is, the memory controller 130 manages the second index 142_i based on a cache algorithm such as a tree algorithm, a linear algorithm, or a hash algorithm and searches the second buffer 142 based on the cache algorithm.

During a write operation of a nonvolatile memory system 120, write data stored in the first buffer 141 is transferred to the second buffer 142. At this time, overhead caused by physical copy of data may be reduced by swapping the first index 141_i and the second index 142_i. Thus, a nonvolatile memory system with improved performance is provided.

Figure 10:
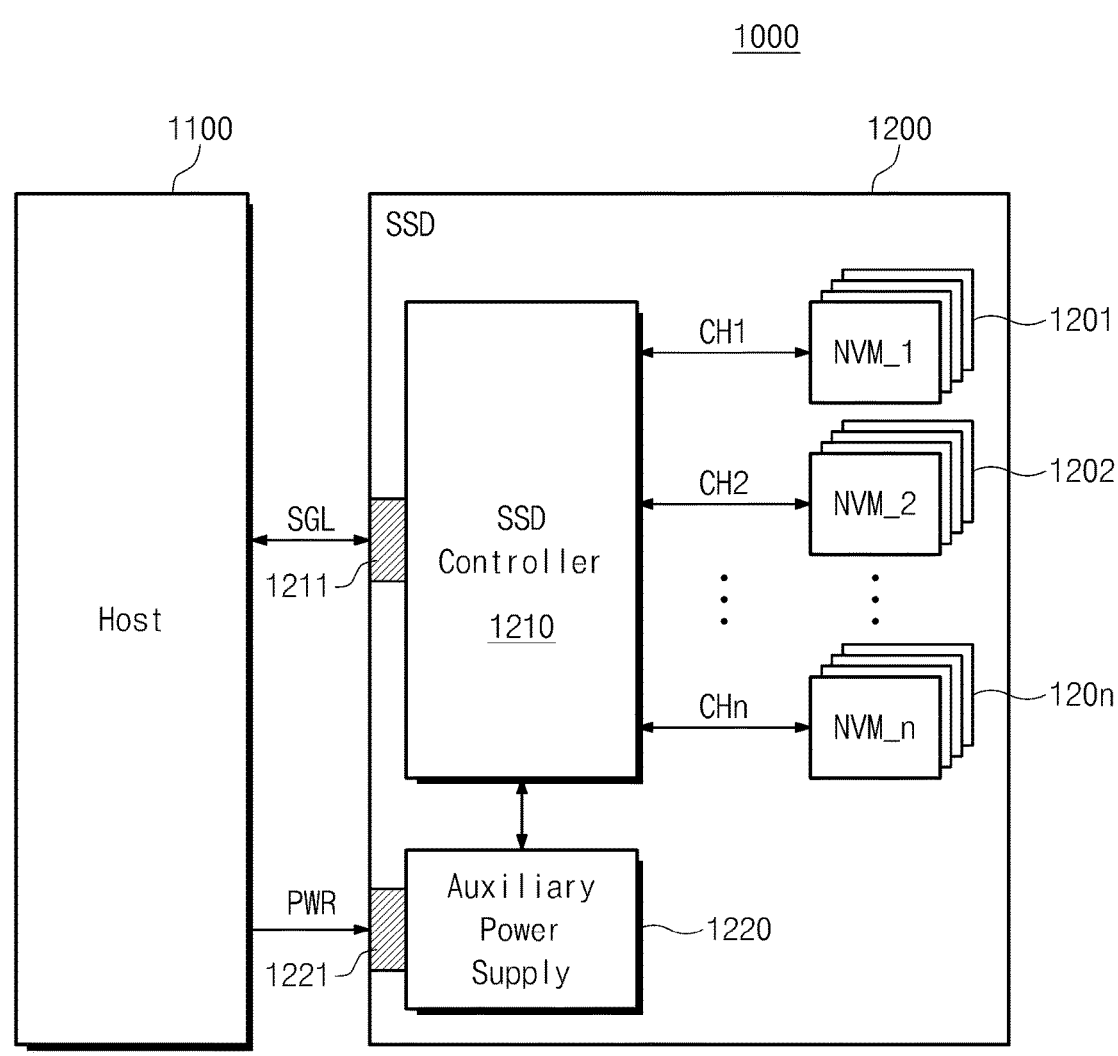
FIG. 10 is a block diagram illustrating a solid state drive system to which a nonvolatile memory system according to an example embodiment of the inventive concepts is applied.

FIG. 10 is a block diagram illustrating a solid state drive system including a nonvolatile memory system according to an example embodiment of the inventive concepts.

Referring to FIG. 10, a solid state drive (SSD) system 1000 includes a host 1100 and an SSD 1200.

The SSD 1200 exchanges signals SGL with the host 1100 through a host connector 1211 and is supplied with a power through a power connector 1221. The SSD 1200 includes a plurality of flash memories 1201 to 120n, an SSD controller 1210, and an auxiliary power supply 1220.

The plurality of flash memories 1201 to 120n may be used as a storage medium of the SSD 1200. The SSD 1200 may use not only a flash memory but also nonvolatile memory devices such as PRAM, MRAM, ReRAM, FRAM, etc. The plurality of flash memories 1201 to 120n is connected to the SSD controller 1210 through a plurality of channels CH1 to CHn. Each of the channels CH1 to CHn may be connected to one or more flash memories 1201 to 120n. Flash memories 120n connected to one channel CHn may be connected to the same data bus.

The SSD controller 1210 exchanges signals SGL with the host 1100 through the signal connector 1211. The signals SGL may include a command, an address, data, etc. The SSD controller 1210 is configured to write or read out data to or from a corresponding flash memory according to a command of the host 1100. The SSD controller 1210 operates based on an operation method described with reference to FIGS. 1 to 9. For example, the SSD controller 1210 may include a buffer memory. The buffer memory operates according to a control of the SSD controller 1210 based on a method with reference to FIGS. 1 to 10.

The auxiliary power supply 1220 is connected to the host 1100 via the power connector 1221. The auxiliary power supply 1220 is charged by a power PWR from the host 1100. The auxiliary power supply 220 may be placed inside or outside the SSD 1200. For example, the auxiliary power supply 1220 may be put on a main board to supply an auxiliary power to the SSD 1200.

Figure 11:
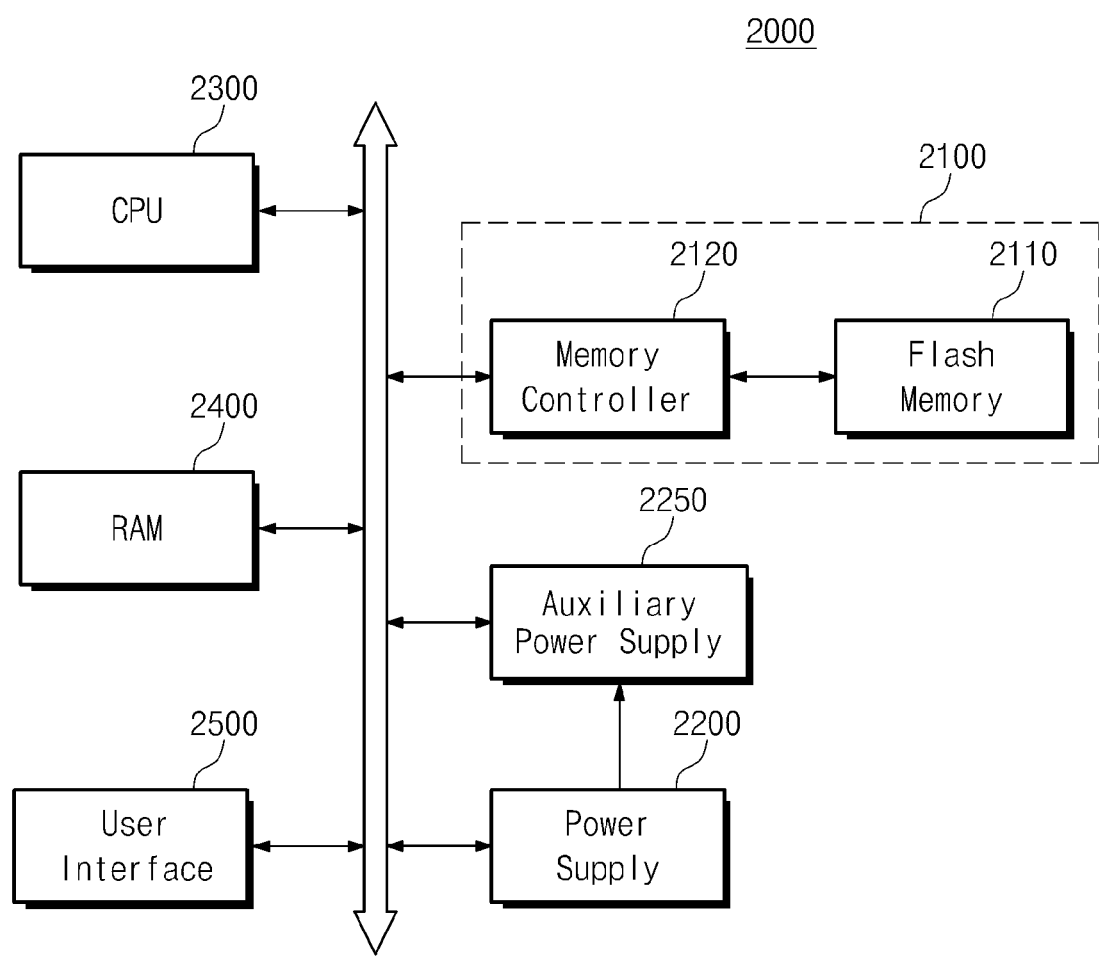
FIG. 11 is a block diagram schematically illustrating an electronic device to which a nonvolatile memory system according to an example embodiment of the inventive concepts is applied.

FIG. 11 is a block diagram schematically illustrating an electronic device including a nonvolatile memory system according to an example embodiment of the inventive concepts.

Referring to FIG. 11, an electronic device 2000 may be a computing system such as a ultra-mobile personal computer (UMPC), a workstation, a net-book, a personal digital assistance (PDA), a portable computer, a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, etc.

The electronic device 2000 includes a memory system 2100, a power supply device 2200, an auxiliary power supply 2250, a CPU 2300, a RAM 2400, and a user interface 2500. The memory system 2100 includes a flash memory 2110 and a memory controller 2120. The memory system 2100 may operate based on an operation method described with reference to FIGS. 1 to 9. For example, the memory controller 2120 may include a buffer memory and controls the buffer memory based on a method with reference to FIGS. 1 to 9.

Figure 12:
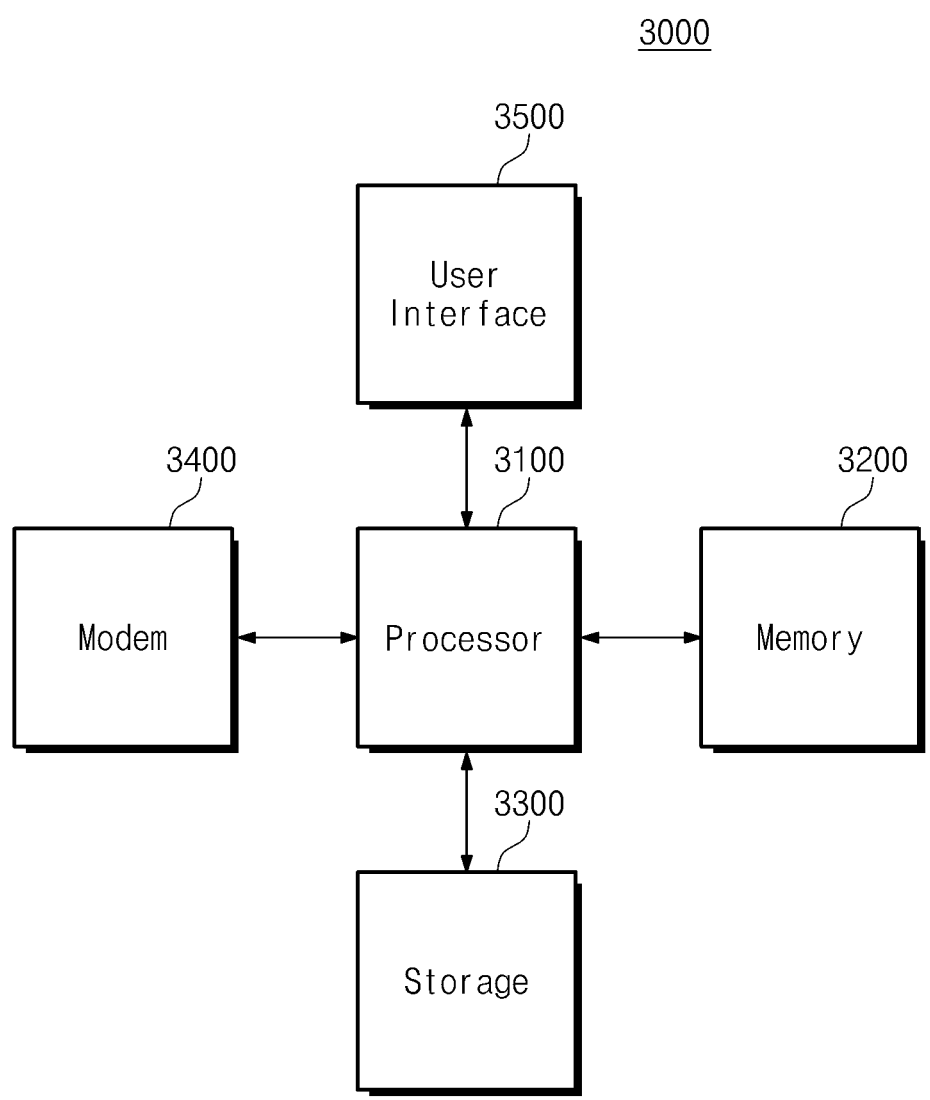
FIG. 12 is a block diagram schematically illustrating a mobile system to which a nonvolatile memory system according to an example embodiment of the inventive concepts is applied.

FIG. 12 is a block diagram schematically illustrating a mobile system to which a nonvolatile memory system according to an embodiment of the inventive concepts is applied.

Referring to FIG. 12, a mobile system 3000 includes a processor 3100, a memory 3200, storage 3300, a modem 3400, and a user interface 3500.

The processor 3100 controls an overall operation of the mobile device 3000 and may perform various calculations. The processor 3100 is formed of a system-on-chip (SoC). The processor 3100 may be a general purpose processor programmed to create a special-purpose computer performing the operating method described with reference to FIGS. 1 to 9 or an application processor programmed to perform the same.

The memory 3200 exchanges data with the processor 3100. The memory 3200 may be a main memory of the processor 3100 or the mobile device 3000. The memory 3200 may include a volatile memory such as a static RAM, a dynamic RAM, a synchronous DRAM, etc. or a nonvolatile memory such as a flash memory, a Phase-change RAM (PRAM), a Magnetic RAM (MRAM), a Resistive RAM (RRAM), a Ferroelectric RAM (FRAM), etc.

The storage 3300 may be used to store data for a long time. The storage 3300 may include a hard disk drive or a nonvolatile memory such as a flash memory, a PRAM (Phase-change RAM), an MRAM (Magnetic RAM), an RRAM (Resistive RAM), an FRAM (Ferroelectric RAM), etc. For example, the storage 3300 is a nonvolatile memory system described with reference to FIGS. 1 to 10. The storage 3300 may include a buffer memory and manages the buffer memory as described with reference to FIGS. 1 to 10.

In example embodiments, the storage 3300 is the nonvolatile memory 150 shown in FIG. 4, and the processor 3100 includes the memory controller 130 shown in FIG. 4.

That is, the processor 3100 is configured to control the storage 3300, and the processor 3100 and the storage 3300 operate based on the operation method described with reference to FIGS. 1 to 10.

In example embodiments, the memory 3200 and the storage 3300 may be formed of the same type of nonvolatile memories. In that case, the memory 3200 and the storage 3300 may be integrated in a semiconductor integrated circuit.

The modem 3400 communicates with an external device according to a control of the processor 2100. For example, the modem 3400 may communicate with the external device in a wire or wireless manner. The modem 3400 may communicate based on at least one of wireless communications manners such as LTE (Long Term Evolution), WiMax, GSM (Global System for Mobile communication), CDMA (Code Division Multiple Access), Bluetooth, NFC (Near Field Communication), WiFi, RFID (Radio Frequency Identification), etc. or wire communications manners such as USB (Universal Serial Bus), SATA (Serial AT Attachment), SCSI (Small Computer Small Interface), Firewire, PCI (Peripheral Component Interconnection), etc.

The user interface 3500 may interface communications with a user according to a control of the processor 3100. For example, the user interface 3500 may include user input interfaces such as a keyboard, a keypad, a button, a touch panel, a touch screen, a touch pad, a touch ball, a camera, a microphone, a gyroscope sensor, a vibration sensor, etc. The user interface 3500 may further include user output interfaces such as an LCD, an OLED (Organic Light Emitting Diode) display device, an AMOLED (Active Matrix OLED) display device, an LED, a speaker, a motor, etc.

A nonvolatile memory system according to an example embodiment of the inventive concepts may include a memory controller, a buffer memory, and a nonvolatile memory. The buffer memory may include a data transfer buffer and a program management buffer. The nonvolatile memory system may allocate a DMA buffer in response to a read/write request provided from a host. At that time, the nonvolatile memory system may not perform a search operation for determining if the buffer memory includes write data or read data. Since there is reduced overhead caused by the search operation, DMA latency may be reduced. Thus, the nonvolatile memory system and its operation method may have improved performance.

While example embodiments of the inventive concepts have been described with reference to some example embodiments, it will be apparent to those skilled in the art that various changes and modifications may be made without departing from the spirit and scope of the example embodiments. Therefore, it should be understood that the above example embodiments are not limiting, but illustrative.

What is claimed is:

1. A nonvolatile memory system comprising:
a nonvolatile memory;
a buffer memory, the buffer memory including a first buffer and a second buffer; and
a memory controller configured to:
manage the first buffer and the second buffer based on a first index and a second index, the first index including first mapping information, the first mapping information mapping a logical page number of the first buffer to a logical address corresponding to data received from a host, the second index including second mapping information, the second mapping information mapping a logical page number of the second buffer to a logical address corresponding to the data received from the host, and
control the nonvolatile memory in response to a write request provided from an external device, the controlling the nonvolatile memory in response to the write request including;
allocating a part of the first buffer to a Direct Memory Access (DMA) buffer in response to the write request,
storing write data received from the external device in the allocated DMA buffer based on a DMA operation,
partially swapping the first index and the second index to shift the write data stored in the allocated DMA buffer to the second buffer, when the second buffer does not contain the write data, such that the memory controller shifts the write data from the allocated DMA buffer to the second buffer without physically copying the write data from logical addresses associated with the allocated DMA buffer to logical addresses associated with the second buffer, and
transmitting the write data from the second buffer to the nonvolatile memory.

2. The nonvolatile memory system of claim 1, wherein the memory controller comprises:
a central processing unit configured to allocate the part of the first buffer to the DMA buffer in response to the write request; and
a DMA engine configured to perform the DMA operation in response to programming thereof by the central processing unit.

3. The nonvolatile memory system of claim 2, wherein the central processing unit is configured to program the DMA engine with information of the allocated DMA buffer, and
the DMA engine is configured to perform the DMA operation based on the information of the allocated DMA buffer.

4. The nonvolatile memory system of claim 1, wherein when the write data stored in the allocated DMA buffer is shifted to the second buffer, the memory controller is configured to determine whether the second buffer includes the write data and partially swap the first and second indexes when the second buffer does not include the write data.

5. The nonvolatile memory system of claim 4, wherein the memory controller is configured to provide the nonvolatile memory with the write data included in the second buffer when the second buffer includes the write data, and
the nonvolatile memory is programmed with the write data transferred from the memory controller.

6. The nonvolatile memory system of claim 1, wherein the memory controller is configured to manage the second buffer based on at least one of a hash algorithm, a tree algorithm, and a linear algorithm.

7. The nonvolatile memory system of claim 1, wherein the first and second buffers are logically distinguished.

8. The nonvolatile memory system of claim 1, wherein the memory controller is configured to control the nonvolatile memory in response to a read request provided from the external device, the controlling the nonvolatile memory in response to the read request including,
allocating a part of the first buffer to a DMA read buffer in response to the read request,
storing read data read from the nonvolatile memory in the allocated DMA read buffer, and providing the external device with the read data stored in the allocated DMA read buffer.

9. The nonvolatile memory system of claim 8, wherein the memory controller is configured to release the allocated DMA read buffer of the first buffer after the read data is transferred to the external device.

10. A method of operating a nonvolatile memory system, the nonvolatile memory system including a first buffer, a second buffer and a nonvolatile memory, the first buffer managed based on a first index and the second buffer managed based on a second index, the first index including first mapping information, the first mapping information mapping a logical page number of the first buffer to a logical address corresponding to data received from a host, the second index including second mapping information, the second mapping information mapping a logical page number of the second buffer to a logical address corresponding to the data received from the host, the operation method comprising:
 allocating a part of the first buffer to a Direct Memory Access (DMA) buffer in response to a write request from an external device;
 storing write data in the allocated DMA buffer;
 partially swapping the first index and the second index to shift the write data stored in the allocated DMA buffer to the second buffer when the second buffer does not contain the write data such that the memory controller shifts the write data to the second buffer without physically copying the write data from logical addresses associated with the allocated DMA buffer to logical addresses associated with the second buffer; and
 transmitting the write data stored in the second buffer to the nonvolatile memory.

11. The operation method of claim 10, wherein the partially swapping comprises:
 determining whether the write data is stored in the second buffer; and
 shifting the write data to the second buffer, if the determining determines that the write data is stored in the second buffer.

12. The operation method of claim 11, wherein the shifting the write data comprises:
 partially swapping information of the first index corresponding to the allocated DMA buffer and information of the second index corresponding to a part of the second buffer, if the determining determines that the write data is not stored in the second buffer.

13. The operation method of claim 10, further comprising:
 allocating a part of the first buffer to a DMA read buffer in response to a read request from the external device;
 storing read data read from the nonvolatile memory in the allocated DMA read buffer; and
 transferring the read data stored in the allocated DMA read buffer to the external device.

14. The operation method of claim 13, further comprising:
 releasing the allocated DMA read buffer of the first buffer after the read data stored in the allocated DMA read buffer is transferred to the external device.

15. A non-volatile memory device comprising:
 a buffer memory having logical addresses (LAs) dividing the buffer memory into a first buffer and a second buffer, the first buffer managed based on a first index and the second buffer managed based on a second index, the first index including first mapping information, the first mapping information mapping a logical page number of the first buffer to a logical address corresponding to data received from a host, the second index including second mapping information, the second mapping information mapping a logical page number of the second buffer to a logical address corresponding to the data received from the host, the second buffer configured to temporarily store the data received from the first buffer; and
 a memory controller including a Direct Memory Access (DMA) engine and a Central Processing Unit (CPU), the DMA engine configured to offload, from the CPU, memory access requests associated with data by performing a DMA operation on the data without control from the CPU, the memory controller configured to:
 allocate a portion of the first buffer as a DMA buffer irrespective of whether the buffer memory contains the data,
 store the data at logical addresses associated with the DMA buffer, and
 when the second buffer does not contain the data, transfer information indicating the logical addresses of the data from the first index to the second index such that the memory controller shifts the data to the second buffer without physically copying the data from the logical addresses associated with the DMA buffer to logical addresses associated with the second buffer.

16. The non-volatile memory device of claim 15, wherein the memory controller is configured to transfer the data from the second buffer to a non-volatile memory when the second buffer contains the data.

17. The non-volatile memory device of claim 16, wherein the memory controller is configured to release the DMA buffer after the data is transferred to the non-volatile memory.

18. The non-volatile memory device of claim 15, wherein the memory controller is configured to allocate the portion of the first buffer as the DMA buffer without searching the buffer memory for the data.

19. The non-volatile memory device of claim 17, wherein the memory controller is configured to transfer the data to the second buffer using virtual addressing.

20. The non-volatile memory device of claim 15, wherein the first and second buffers are logically distinct.

* * * * *